United States Patent
Lish et al.

(10) Patent No.: US 9,810,872 B1
(45) Date of Patent: *Nov. 7, 2017

(54) FIBER CLAMP WITH ATTACHMENT ACCESSORY NUB AND RECEPTACLE

(71) Applicant: Google Inc., Mountain View, CA (US)

(72) Inventors: David Frank Lish, Burlingame, CA (US); John Toccalino, Los Altos, CA (US); Ben Warren Segura, Morgan Hill, CA (US); David Anthony, Sunnyvale, CA (US); Fabien Villeneuve, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,100

(22) Filed: Nov. 9, 2016

Related U.S. Application Data (63) Continuation of application No. 14/583,919, filed on Dec. 29, 2014, now Pat. No. 9,517,564.

(51) Int. Cl.
| | |
|---|---|
| *F16L 3/00* | (2006.01) |
| *G02B 6/48* | (2006.01) |
| *F16L 3/10* | (2006.01) |
| *G02B 6/44* | (2006.01) |

(52) U.S. Cl.
CPC ............ *G02B 6/483* (2013.01); *F16L 3/1075* (2013.01); *G02B 6/4422* (2013.01); *G02B 6/4471* (2013.01)

(58) Field of Classification Search
None
See application file for complete search history.

(56) References Cited

U.S. PATENT DOCUMENTS

| | | |
|---|---|---|
| 3,150,539 A | 9/1964 | Wallis |
| 4,393,998 A | 7/1983 | Allen et al. |
| 4,637,097 A | 1/1987 | Secord |
| 4,653,716 A | 3/1987 | Sakaguchi |
| 5,219,134 A | 6/1993 | Morita et al. |
| 5,230,488 A | 7/1993 | Condon |
| 5,236,158 A | 8/1993 | Condon |
| 5,507,460 A | 4/1996 | Schneider |
| 5,622,341 A | 4/1997 | Stana |
| 5,820,082 A | 10/1998 | Wright |
| 6,056,245 A | 5/2000 | White |
| 6,082,675 A * | 7/2000 | Woodall, Jr. ............. B64D 1/02 244/120 |
| 6,378,811 B1 | 4/2002 | Potter et al. |
| 6,892,990 B2 | 5/2005 | Pisczak |
| 7,398,946 B1 | 7/2008 | Marshall |
| 7,467,767 B2 | 12/2008 | Miles et al. |
| 8,074,945 B2 | 12/2011 | Schoenau et al. |
| 9,387,928 B1 * | 7/2016 | Gentry ................. B64C 39/024 |
| 2009/0224111 A1 | 9/2009 | Gilbreath |

(Continued)

*Primary Examiner* — Monica Millner
(74) *Attorney, Agent, or Firm* — Lerner, David, Littenberg, Krumholz & Mentlik, LLP (57) ABSTRACT

Technology for securing a line, such as a fiber optic line, to a structure, such as a utility pole. In one aspect, a clamp is provided. The clamp includes a body, a first nub located at a first position on the body, and a first receptacle located at a second position on the body, wherein the first receptacle is connectable with a second nub that is secured to a polemount, and the first nub is connectable with a second receptacle that is secured to an aerial drone.

19 Claims, 4 Drawing Sheets

(56) References Cited

U.S. PATENT DOCUMENTS

2014/0032034 A1\* 1/2014 Raptopoulos ........ G08G 5/0069
                                                              701/25
2014/0131528 A1 5/2014 Blakeley et al.
2014/0284432 A1 9/2014 Shepard
2015/0323101 A1 11/2015 Hobson \* cited by examiner

FIBER CLAMP WITH ATTACHMENT ACCESSORY NUB AND RECEPTACLE

CROSS-REFERENCE TO RELATED APPLICATIONS

The present application is a continuation of U.S. patent application Ser. No. 14/583,919, filed Dec. 29, 2014, the disclosure of which is incorporated herein by reference.

BACKGROUND

Unless otherwise indicated herein, the materials described in this section are not prior art to the claims in this application and are not admitted to be prior art by inclusion in this section.

Attaching lines, such as optical fibers, coaxial cables, power lines, or other types of utility lines, to utility poles, communications poles, power poles or streetlights is difficult and dangerous due to the height of the pole or light, and expensive due to the specialized training necessary to complete the work. For example, attachment can take place in the power zone of a utility pole or in the communications zone of a utility pole, with differing requirements for the two zones and with the cost and availability of power technicians creating substantial commercial challenges. Further complicating matters are requirements that may dictate minimum crew size, relationships between crew size and the number of foreman and managers, and in the case of power zone work, the ratio of master electricians to apprentices. This confluence of labor restrictions drives up the cost of construction activities and increases the likelihood that pole attachments become a schedule gating factor in overall market deployment.

For example, the current solutions for "clamping" optical fiber to a pole are clunky and require multiple steps. In many cases, the current solutions utilize a bolt placed entirely though the pole to secure a fiber clamp into place via a washer and nut. These solutions necessitate a high degree of manual manipulation by a technician who must work from an elevated platform such as the bucket of a bucket truck. Moreover, the current solutions typically call for the use of several tools, for instance a wrench, a drill, vice grips, etc., and are man-hour intensive. The multitude of tools and extensive labor which are currently required for clamping fibers to poles greatly increases the cost of such operations.

BRIEF SUMMARY

The present technology is directed towards the routing and securing of lines, such as fiber optic lines, and in particular to a clamp for securing lines to a utility pole via a pole-mount.

In view of the drawbacks associated with current solutions for routing and securing lines, the present technology was conceived. In one implementation of the technology, a clamp is provided for securing a line. The clamp includes a body, a first nub located at a first position on the body, and a first receptacle located at a second position on the body, wherein the first receptacle is connectable with a second nub that is secured to a pole-mount, and the first nub is connectable with a second receptacle that is secured to an aerial drone In this manner, the drone may link to the clamp via the first nub, carry the clamp to the pole-mount, attach the clamp to the mount by pressing the second receptacle of the clamp into the second nub of the mount, and release from the clamp and fly away.

The present technology provides numerous advantages over the prior technology. One advantage is the elimination of the need to elevate a man to the pole mounting position, thereby obviating the need for elevating platforms such as a bucket truck. Further, since the clamp may be linked to the pole-mount by merely pressing the clamp into the mount, there is no need for tools to attach the clamp to the mount. These advantages and others will be apparent in view of the following detailed description of the present technology.

DETAILED DESCRIPTION

Examples of apparatuses, systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1A:
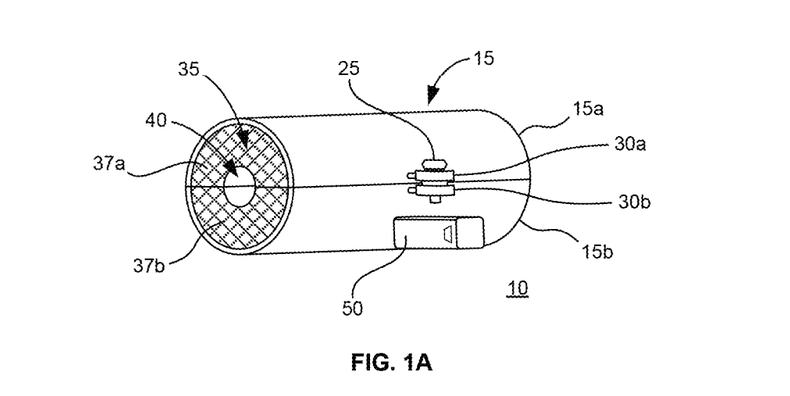
FIG. 1A is a front isometric view of a single fiber clamp.

FIG. 1A is a front isometric view of a single fiber clamp 10. As can be seen from the figure, the clamp 10 includes a body 15. The body 15 may be made up of two or more parts, and the parts may be of any shape. In the illustrative clamp 10 of the figure, the body 15 includes two parts, a first part 15a and a second part 15b, and each of parts 15a and 15b has a half cylindrical shape. The parts 15a and 15b may be hinged together by alternating hinges 20a and 20b, as shown in FIG. 1B, although alternating hinges 20a and 20b are provided solely for sake of illustration and upon reviewing this disclosure one skilled in the art will recognize many alternatives for coupling together parts 15a and 15b.

The first part 15a and second part 15b of clamp 10 may be secured to each other via a screw 25. To this end, part 15a may include a tab 30a and part 15b may include a tab 30b, the tabs 30a and 30b each having a threaded hole for accommodating screw 25. Thus, when parts 15a and 15b are secured to each other, the clamp is in a closed position and the parts form a cylindrical shell. In one implementation, the parts 15*a* and 15*b* are each made of material that is solid and difficult to deform, such as cast aluminum. Further, the clamp 10 may include a rubber grommet 35 housed with the cylindrical shell. The rubber grommet 35 may be made up of two pieces 37*a* and 37*b* as shown in FIG. 1A, or may be made up of a single piece or more than two pieces. In any event, rubber grommet 35 includes a through-hole 40 for allowing a line, such as a fiber optic line, to pass through. The rubber grommet 35 ensures optimal grip of the line while limiting the chance of damage to the line.

Clamp 10 includes a nub 50. In the depicted configuration, nub 50 protrudes from part 15*b*. Moreover, in the depicted configuration, nub 50 protrudes from part 15*b* such that the longitudinal axis of nub 50 is perpendicular to a plane that bisects both of parts 15*a* and 15*b* when the clamp 10 is in a closed position. In one implementation, nub 50 is a male type of connector that is connectable with a corresponding female type connector. However, nub 50 may be a female type of connector that is connectable with a corresponding male type connector. Moreover, nub 50 may take any form suitable for connection to another element or device and is not limited to male and female forms. In addition, regardless of type nub 50 may be connectable to another clamp having a connector that corresponds to nub 50.

Figure 1B:
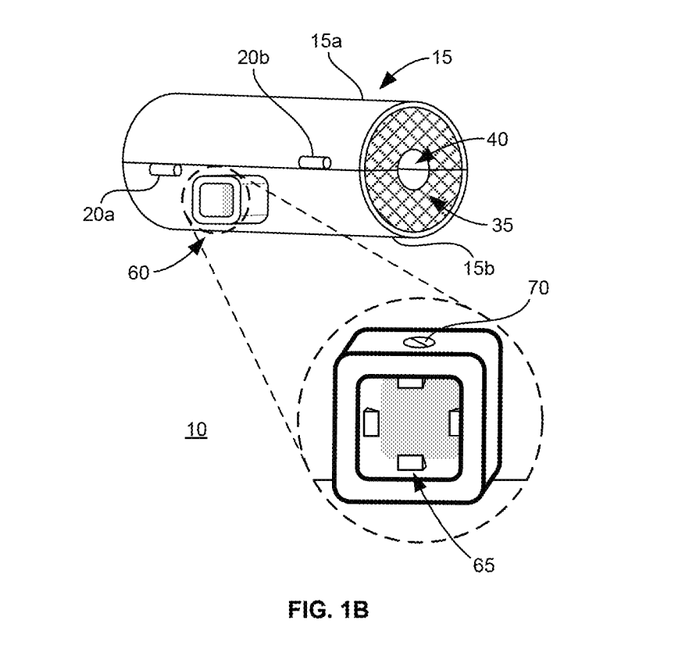
FIG. 1B is back isometric view of the single fiber clamp of FIG. 1A, including a detail view of a receptacle of the clamp.

Referring now to FIG. 1B, there is shown a back isometric view of clamp 10 of FIG. 1A, including a detail view of a receptacle 60 of the clamp. In the depicted configuration, receptacle 60 protrudes from part 15*b*. Moreover, in the depicted configuration, receptacle 60 protrudes from part 15*b* such that the longitudinal axis of receptacle 60 is perpendicular to a plane that bisects both of parts 15*a* and 15*b* when the clamp is in a closed position. In one implementation, receptacle 60 is a female type of connector that is connectable with a corresponding male type connector. However, receptacle 60 may be a male type of connector that is connectable with a corresponding female type connector. Moreover, receptacle 60 may take any form suitable for connection to another element or device and is not limited to male and female forms. In addition, regardless of type, receptacle 60 may be connectable to another clamp having a connector that corresponds to receptacle 60.

In the embodiment of FIGS. 1A and 1B, nub 50 and receptacle 60 are positioned on opposite sides of a plane that bisects the clamp 10 when the clamp is in a closed position. Further, in such embodiment nub 50 and receptacle 60 are positioned on opposite sides of a plane that bisects each of part 15*a* and part 15*b* when the clamp 10 is in a closed position. Additionally, in the embodiment of FIGS. 1A and 1B nub 50 and receptacle 60 share a longitudinal axis. Nevertheless, in some embodiments, a longitudinal axis of the nub 50 and a longitudinal axis of the receptacle may be parallel without the longitudinal axis of the nub 50 and the longitudinal axis of the receptacle being the same axis.

Regarding receptacle 60, FIG. 1B shows a detailed view of one possible embodiment of the receptacle. As can be seen from the figure, the receptacle 60 may have a generally rectangular shape, and may include one or more teeth such as teeth 65 and a locking mechanism 70. The teeth 65 may be included for purposes of engaging with a corresponding connector, such as nub 50, when such connector is pressed into receptacle 60. The receptacle 60 may be coupled to a corresponding connector by, for example, press-fitting the receptacle to the corresponding connector or snap-fitting the receptacle to the corresponding connector. In the case of snap-fitting, the teeth may secure the corresponding connector to receptacle 60. The locking mechanism 70 may be included for purposes of locking the corresponding connector to receptacle 60 after the connector has been engaged by teeth 65. In the implementation of FIG. 1B, the locking mechanism is a screw which may screw into a threaded hole on the corresponding connector.

It should be noted that each of teeth 65 and locking mechanism 70 may be used without the other. That is, receptacle 60 may include teeth 65, but not locking mechanism 70, or may include locking mechanism 70, but not teeth 65. Further, teeth 65 are merely illustrative. Upon viewing this disclosure one skilled in the art will readily appreciate many engagement mechanisms that may be substituted for teeth 65. Similarly, locking mechanism 70 need not include a screw, and upon viewing this disclosure one skilled in the art will readily appreciate the many alternative forms for locking mechanism 70.

Figure 2:
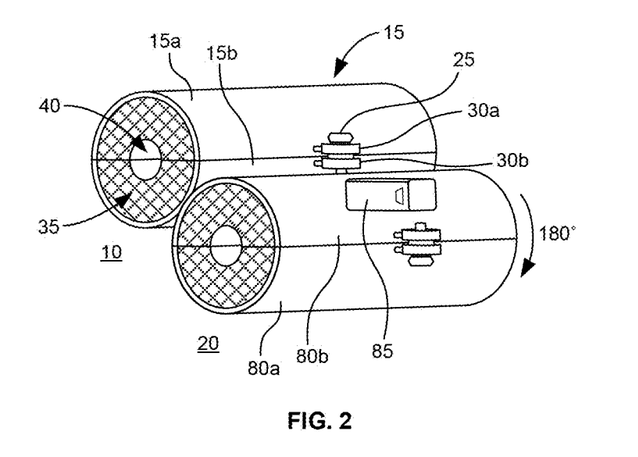
FIG. 2 is an isometric view of two single fiber clamps nested together, each clamp being of the type depicted in FIGS. 1A and 1B.

Referring now to FIG. 2, there is shown an isometric view of two single fiber clamps nested together, each clamp being of the type depicted in FIGS. 1A and 1B. In FIG. 2, clamp 10 is shown coupled to an identical clamp, clamp 20. Clamp 20 includes a first part 80*a* and a second part 80*b*, respectively corresponding to parts 15*a* and 15*b* of clamp 10, and a nub 85 corresponding to nub 50 of clamp 10. Clamp 20 also includes a receptacle corresponding to the receptacle 60 of clamp 10, but the receptacle of clamp 20 cannot be seen in FIG. 2. In the FIG. 2 configuration, clamp 20 has been rotated 180 degrees relative to clamp 10 so that the receptacle on clamp 20 (not shown) can connect with the nub 50 on clamp 10 without tab 30*a*, tab 30*b* and screw 25 of clamp 10 obstructing such connection. The relative positions of clamps 10 and 20 in the FIG. 2 configuration can be achieved by first orienting both clamps such that their first parts, 15*a* and 80*a*, are positioned vertically above their second parts, 15*b* and 80*b*, and such that the longitudinal axes of their nubs and receptacles form a single shared axis, and then rotating clamp 20 by 180 degrees about the shared axis.

In order to allow clamps 10 and 20 to be connected in the manner shown in FIG. 2, the nub 50 on clamp 10 is designed to be connectable to the receptacle on clamp 20 when clamp 20 is rotated 180 degrees relative to clamp 10. The nub 50 on clamp 10 may be connectable to the receptacle on clamp 20 only when clamp 20 is rotated 180 degrees, when clamp 20 is rotated 180 degrees or 0 degrees, when clamp 20 is rotated at any of 180 degrees, 0 degrees, 90 degrees and 270 degrees, or when clamp 20 is rotated at any angle in the range of 0 degrees to 360 degrees.

As an optional feature, any of the nubs and receptacles on clamps 10 and 20 may actuate. Such actuation may be provided for purposes of accommodating shear forces. For example, receptacle 60 on clamp 10 may actuate in a plane that includes the longitudinal axis of the receptacle 60. Further, receptacle 60 may actuate in a plane that includes the longitudinal axis of the receptacle and is parallel to the longitudinal axis of through-hole 40. The amount and direction of actuation may be varied in accordance with the desired application of the clamp 10. For instance, receptacle 60 may actuate in a range of −7.5 degrees to +7.5 degrees in a plane that that includes the longitudinal axis of the receptacle and is parallel to the longitudinal axis of through-hole 40. Also, actuation need not be limited to only one nub on a clamp or only one receptacle on a clamp. For example, each of receptacle 60 and nub 50 on clamp 10 may actuate in a plane that includes the longitudinal axis of the receptacle 60, and each of each of receptacle 60 and nub 50 on clamp 10 may actuate.

In any event, the clamps of FIGS. 1A-2 are designed for simplicity and ease of use. For example, clamp 10 may be readily connected to a mount on a utility pole via receptacle 60. In such embodiment, the mount includes a nub similar to, or the same as, nubs 50 and 85, and clamp 10 is attached to the mount simply by pressing receptacle 60 onto the nub on the mount. As an option, clamp 10 could be locked to the mount by use of a locking mechanism such as locking mechanism 70. Further, once clamp 10 is coupled to the mount a second clamp, such as clamp 20, could be readily coupled to clamp 10 by simply pressing the receptacle of clamp 20 onto nub 50 of clamp 10. Still further, clamps 10 and 20 could be arranged in the nested fashion show in FIG. 2 and then coupled to the utility pole mount by pressing the receptacle 60 of clamp 10 onto the nub on the mount. In any event once a clamp is attached to the mount, a line, such as a fiber optic line, may be secured within the clamp.

In some embodiments, an aerial drone may be used to attach a clamp to a pole. For example, an aerial drone may be employed to attach a mount to a utility pole and to attach a clamp, such as clamp 10, to the mount. In this regard, FIG. 3 shows a plan view of clamp 10 linked to an aerial drone 90.

Figure 3:
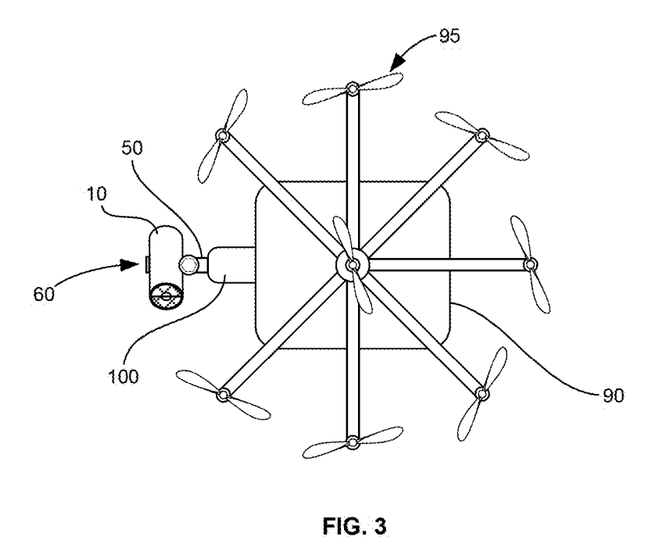
FIG. 3 is a plan view of a clamp linked to an aerial drone.

As can be seen from FIG. 3, aerial drone 90 includes a number of rotors 95 and a receptacle 100. The rotors are provided for lift and control of the drone 90, while receptacle 100 is provided for coupling to clamp 10. The drone 90 may include any number of rotors and any number of receptacles, and the rotors 95 and receptacle 100 are provided merely for purposes of illustration. Moreover, drone 90 need not include any rotors and may take the form of any type of aircraft, such as a balloon with one or more propellers, and drone 90 need not include one or more receptacles and may include one or more alternative attachment elements.

The receptacle 100 of drone 90 couples to clamp 10 via nub 50 of clamp 10. Once the clamp 10 is secured to the drone 90 the drone can carry the clamp to a desired destination, such as a mount attached to a utility pole.

Figure 4A:
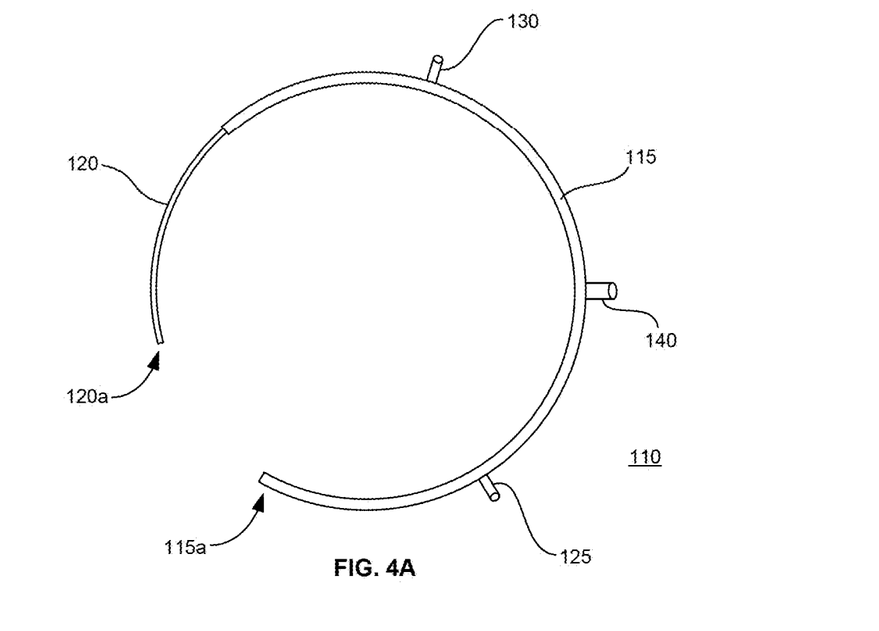
FIG. 4A is a plan view of a pole-mount to which a clamp may be attached.

FIG. 4A is a plan view of a pole-mount 110 to which clamp 10 may be attached. The pole-mount 110 is semi-circular in shape, although any shape may be substituted for the semi-circular shape as dictated by the pole to which the pole-mount will be attached. The pole-mount 110 includes a body 115 and arm 120. The body 115 includes a connecting portion 115a at one end of the body, and the arm 120 includes a connecting portion 120a at one end of the arm. The pole-mount 110 further includes a stabilizing pin 125, an extension pin 130, and a nub 140. The extension pin 130 and nub 140 can be seen more clearly in FIG. 4B, which is a side elevation view of the pole-mount 110 of FIG. 4A. As can be seen from FIG. 4B, the radially inward portion of the pole-mount 110 defines an inner surface 155 of the pole-mount, and the extension pin 130 is attached to arm 120 through a slot 150 in body 115.

Figure 4B:
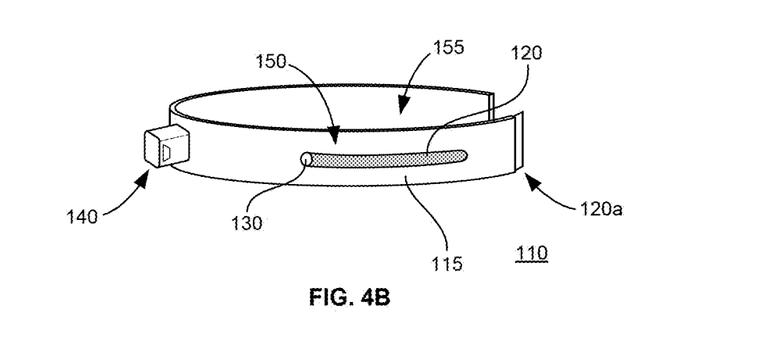
FIG. 4B is a side elevation view of the pole-mount of FIG. 4A.

In one implementation, the pole-mount 110 is attached to a utility pole by a technician who is elevated to a communications section of a utility pole. The technician arranges the mount 110 with arm 120 in a retracted position, such as a position in which arm 120 is nested within body 115. Then, when in the elevated position, the technician places the mount 110 against the pole such that inner surface 155 contacts the pole. With the mount positioned against the pole, the technician grasps the extension pin 130 with his right hand and pushes the extension pin 130 away from his body until the arm 120 is extended sufficiently to have connecting portion 120a connect with connecting portion 115a. Such connection may be indicated by, for example, an audible click that is created when the connecting portion 120a connects with connecting portion 115a. In one implementation, the connecting portion 120a is formed as a male connecting portion, the connecting portion 115a is formed as a female connection portion, and the connecting portions create a click when the male portion is inserted in the female portion.

Once the portions 120a and 115a are connected, the technician pulls the extension pin 130 toward his body to retract arm 120 and thereby tighten the pole-mount 110 about the pole. The arm 120 is locked into the tightened position by a locking mechanism (not shown). The locking mechanism may be, for example, a ratcheting lock that is activated by the stabilizing pin 125. When the stabilizing pin 125 is used to activate a ratcheting lock, the technician may grasp the stabilizing pin with his left hand after extending the arm 120 but before pulling the extension pin 130 to tighten the mount 110, activate the lock using his left hand, and then pull the extension pin with his right hand.

In an alternative implementation, the pole-mount 110 is attached to a utility pole by a technician who remotely positions the pole-mount on the pole via aerial drone 90. When the aerial drone 90 is used, the pole-mount 110 is first coupled to the drone in much the same manner that clamp 10 is coupled to the drone (as shown in FIG. 3). More specifically, the technician couples the pole-mount 110 to the drone 90 by pressing the nub 140 of the pole-mount into the receptacle 100 of the drone, and then uses the drone to fly the pole-mount 110 to the desired position on the pole. Once the pole-mount 110 is positioned, the drone 90 uses mechanical arms (not shown) to engage the extension pin 130 and stabilizing pin 125 and tighten the mount to the pole.

The present technology may be configured as follows.

1) A clamp for securing a line, including a body; a first nub located at a first position on the body; and a first receptacle located at a second position on the body, wherein the first receptacle is connectable with a second nub that is secured to a pole-mount, and the first nub is connectable with a second receptacle that is secured to an aerial drone.

2) The clamp according to 1, wherein the first nub is a male type, and the first receptacle is a female type that is compatible with the male type of the first nub.

3) The clamp according to 1 or 2, wherein the first nub is connectable with an other receptacle of the female type by pressing together the first nub and the other receptacle.

4) The clamp according to any of 1 to 3, wherein the first nub is connectable with an other receptacle of the female type by snap-fitting the first nub to the other receptacle.

5) The clamp according to any of 1 to 4, wherein the first nub is connectable with an other receptacle of the female type and the other receptacle includes one or more teeth for engaging the first nub.

6) The clamp according to any of 1 to 5, wherein the first nub is connectable with an other receptacle of the female type by pressing together the first nub and the other receptacle and activating a locking mechanism.

7) The clamp according to any of 1 to 6, wherein the first nub and the second nub are a male type, and the first receptacle and the second receptacle are a female type that is compatible with the male type.

8) The clamp according to any of 1 to 7, wherein the first position and the second position are located on opposite sides of a plane bisecting the clamp.

9) The clamp according to any of 1 to 8, wherein a longitudinal axis of the first nub is parallel with a longitudinal axis of the first receptacle.

10) The clamp according to any of 1 to 9, wherein the body is cylindrically shaped.

11) The clamp according to any of 1 to 10, wherein the first nub is operable to actuate in a plane that includes a longitudinal axis of the first nub.

12) The clamp according to any of 1 to 11, wherein the clamp further includes a through-hole for accommodating the line, and wherein the first nub is operable to actuate in a plane that is parallel to a longitudinal axis of the through-hole.

13) The clamp according to any of 1 to 12, wherein the first receptacle is operable to actuate in a plane that includes a longitudinal axis of the first receptacle.

14) The clamp according to any of 1 to 13, wherein the clamp further includes a through-hole for accommodating the line, and wherein the receptacle is operable to actuate in a plane that is parallel to a longitudinal axis of the through-hole.

15) The clamp according to any of 1 to 14, wherein the body includes two parts that are hinged together, the two parts being configurable in an open position for insertion of a line and a closed position for securing the line.

16) The clamp according to any of 1 to 15, wherein when the two parts are in the closed position the two parts form a cylindrical shell.

17) A system for securing a line to a pole, including a pole-mount having a first nub; and a clamp having a body, a receptacle, and a second nub, the receptacle being connectable with the first nub, and the second nub being connectable with a second receptacle that is secured to an aerial drone.

18) The system according to 17, wherein the first nub is a male type, and the receptacle is a female type that is connectable with the first nub.

19) The system according to 17 or 18, wherein the first nub and the receptacle are connectable by pressing together the first nub and the receptacle.

20) The system according to any of 17 to 19, wherein the receptacle is operable to actuate in a plane that includes a longitudinal axis of the receptacle.

21) The system according to any of 17 to 20, wherein the clamp further includes a through-hole for accommodating the line, and wherein the receptacle is operable to actuate in a plane that is parallel to a longitudinal axis of the through-hole.

22) The system according to any of 17 to 21, wherein the second nub is a male type, the second receptacle is a female type, and the second nub and second receptacle are connectable by pressing together the second nub and the second receptacle.

23) A method for securing a line to a pole, including using an aerial drone to attach a clamp to the pole.

24) The method according to 23, wherein using an aerial drone includes using the aerial drone to fly a pole-mount to a desired position on the pole, tighten the pole-mount to the pole, fly the clamp to the pole-mount on the pole, and connect the clamp to the pole-mount.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A clamp for securing a line to a pole having a pole mount using an aerial drone, comprising:
a body;
a first clamp connector located at a first position on the body; and
a second clamp connector located at a second position on the body,
wherein the first clamp connector is adapted to connect with a drone connector secured to the aerial drone upon advancing the drone towards the first clamp connector, and
wherein the second clamp connector is adapted to connect with a pole-mount connector that is secured to the pole-mount upon advancing the drone and the second clamp connector towards the pole-mount connector.

2. The clamp of claim 1, the first clamp connector having a first longitudinal axis substantially perpendicular to a first plane that bisects the body, and the second clamp connector having a second longitudinal axis substantially perpendicular to a second plane that bisects the body, wherein the first plane and the second plane are the same plane.

3. The clamp of claim 1, the first clamp connector having a first longitudinal axis substantially perpendicular to a first plane that bisects the body, and the second clamp connector having a second longitudinal axis substantially perpendicular to a second plane that bisects the body, wherein the first axis and the second axis are the same axis.

4. The clamp of claim 1, wherein the second clamp connector has a second longitudinal axis substantially perpendicular to a second plane that bisects the body, wherein the second clamp connector is further adapted to connect with a third clamp connector of a second clamp by advancing the body along the second longitudinal axis of the second clamp connector towards the third clamp connector.

5. The clamp as recited in claim 1, wherein the first clamp connector is a male type, and the second clamp connector is a female type that is compatible with the male type of the first clamp connector.

6. The clamp as recited in claim 1, wherein the second clamp connector is connectable with the pole-mount connector by snap-fitting the second clamp connector to the pole-mount connector.

7. The clamp as recited in claim 1, wherein the first clamp connector is connectable with the drone connector using one or more teeth.

8. The clamp recited in claim 1, wherein the first clamp connector is connectable with the drone connector by pressing the drone connector into the first clamp connector and activating a locking mechanism.

9. The clamp as recited in claim 1, the first clamp connector having a first longitudinal axis substantially perpendicular to a first plane that bisects the body, wherein the first longitudinal axis of the first clamp connector is parallel with the second longitudinal axis of the second clamp connector.

10. The clamp as recited in claim 1, wherein the body has a circular cross-section.

11. The clamp as recited in claim 1, wherein the body comprises two parts that are hinged together, the two parts being configurable in an open position for insertion of the line and a closed position for securing the line.

12. The clamp as recited in claim 11, wherein when the two parts are in the closed position the two parts form a cylindrical shell.

13. A system for securing a line to a pole using an aerial drone, comprising:
   a pole-mount attached to the pole comprising a pole-mount connector positioned on an outer portion of the pole-mount; and
   a clamp comprising a body configured to accommodate the line, a first clamp connector positioned on a first portion of the body, and a second clamp connector positioned on a second portion of the body, wherein the second clamp connector connects with the pole-mount connector by aligning the second clamp connector with the pole-mount connector and moving the second clamp connector towards the pole-mount connector, and the first clamp connector connects with a drone connector that is secured to and moved by the aerial drone.

14. The system as recited in claim 13, wherein the pole-mount connector and the second clamp connector are connectable by pressing together the pole-mount connector and the second clamp connector.

15. The system as recited in claim 13, wherein the first clamp connector is operable to actuate in a plane that includes a longitudinal axis of the first clamp connector.

16. The system as recited in claim 15, wherein the clamp further comprises a through-hole for accommodating the line, and wherein the first clamp connector is operable to actuate in a plane that is parallel to a longitudinal axis of the through-hole.

17. A method for securing a clamp to a pole, the clamp configured to secure a line to the pole, the method comprising:
   connecting an aerial drone to a clamp;
   flying the aerial drone to the pole;
   using the aerial drone to connect the clamp to the pole; and
   detaching the aerial drone from the clamp.

18. The method of claim 17, further comprising using the aerial drone to fly a pole-mount to the pole, the pole-mount configured to couple the clamp to the pole.

19. The method of claim 18, further comprising using the aerial drone to tighten the pole-mount around the pole.

* * * * *